United States Patent [19]

Dezonno

[11] Patent Number: 5,526,417
[45] Date of Patent: Jun. 11, 1996

[54] AUTOMATIC CALL DISTRIBUTOR WITH AUTOMATED POSTCONVERSATION MESSAGE SYSTEM

[75] Inventor: Anthony J. Dezonno, Downers Grove, Ill.

[73] Assignee: Rockwell International Corporation, Seal Beach, Calif.

[21] Appl. No.: 513,063

[22] Filed: Aug. 9, 1995

Related U.S. Application Data

[63] Continuation of Ser. No. 203,073, Feb. 28, 1994, abandoned.

[51] Int. Cl.[6] .................................................. H04M 3/42
[52] U.S. Cl. ........................ 379/265; 379/266; 379/309; 379/214; 379/88; 379/67
[58] Field of Search ................................. 379/265, 266, 379/309, 216, 142, 214

[56] References Cited

U.S. PATENT DOCUMENTS

| | | | |
|---|---|---|---|
| 4,697,282 | 9/1987 | Winter et al. | 379/67 |
| 4,985,913 | 1/1991 | Shalom et al. | 379/76 |
| 5,181,236 | 1/1993 | LaVallee et al. | 379/67 |
| 5,276,731 | 1/1994 | Arbel et al. | 379/142 |
| 5,309,505 | 5/1994 | Szlam et al. | 379/88 |

*Primary Examiner*—Jeffery Hofsass
*Assistant Examiner*—Parag Dharia
*Attorney, Agent, or Firm*—C. B. Patti; G. A. Montayne

[57] ABSTRACT

An automatic call distributor (20) having a multiport switch (22) controlled by a central processing unit (26) in conjunction with a main memory (24) for connecting calls made from customers at customer telephonic units (16) through an external telephonic switching network (18) with agents stationed at a plurality of agent telephonic sets (12) coupled with the call distributor (20), an automated port conversation announcement system having a hard disk (25) for storing a postconversation voice messages in the voice of a particular agent stationed at an agent telephonic set (12), and a digital audio source card circuit (30) for playing a postconversation voice message in the voice of the particular agent to the customer at the customer telephonic unit (16) connected with the agent telephonic unit (12) in response to a disconnection from the agent telephonic set (12) at which the particular agent is stationed of a two way voice path established between the multiport switch (22) and the agent telephonic set (12).

20 Claims, 5 Drawing Sheets

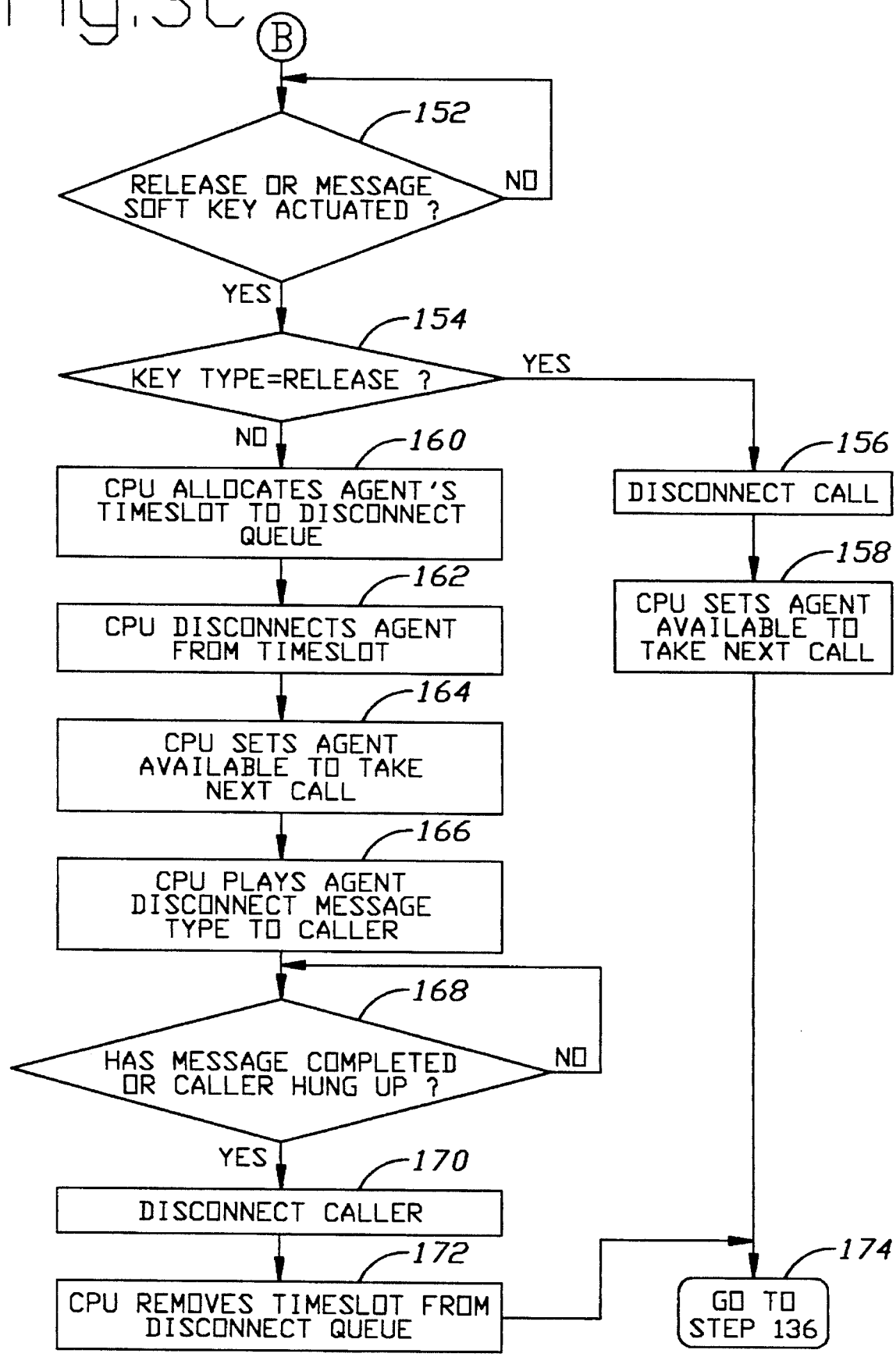

AUTOMATIC CALL DISTRIBUTOR WITH AUTOMATED POSTCONVERSATION MESSAGE SYSTEM

This application is a continuation of application Ser. No. 08/203,073, filed Feb. 28, 1994 now abandoned.

BACKGROUND OF THE INVENTION

1. Field of the Invention

This invention relates generally to the field of automatic telephone call distributors and, more particularly, to an automatic call distributor with an automatic voice message announcement system.

2. Description of the Related Art Including Information Disclosed Under 37 C.F.R. Section 1.97–1.99

Automatic call distributors employing a multiport switch controlled by a central processing unit for selectively interconnecting a plurality of agent sets, each having a telephone, with customer telephonic sets of an external telephonic switching system are well known. Examples of such call distributors are shown in U.S. Pat. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

Automatic call distributors are often employed in a telemarketing environment in which agents stationed at agent sets answer many different types of calls from customers during a work day. In these known systems the agent receives information about the type of customer call on a visual display at the agent set when a call is distributed to the agent. The agent reads the information on the display to determine what type of call (i.e. sales, inventory, customer support, billing, etc.) he is receiving. When concluding a call the agent speaks a farewell phrase which is usually specific to the type of call being serviced. For example, an agent may conclude a call with the phrase "Thank you for calling customer service, have a nice day." Furthermore, the same agent may also answer calls on a different application such as product information and present the caller with a standard concluding comment of "Your order is being processed. Thank you for your interest in our products, goodbye".

The accumulative time, however, spent speaking the concluding remarks for a telephone call decreases the number of calls, and thus the overall efficiency of the agents, due to the large number of calls handled during a work shift. In order to increase agent efficiency, known distribution systems, such as those for a telephone directory assistance application, provide a computer synthesized voice which provides callers the telephone directory number they are requesting instead of the agent or operator speaking the phrase. Such systems, through, are limited to this singular application spoken by a computer controlled voice which is different than the voice of the agent which received the call. The customer is certainly aware that the synthesized voice is not of the servicing agent. The customer frequently becomes annoyed by this impersonal communication since it is obvious to the calling customer that the agent did not show the courtesy of personally concluding the call. Furthermore, these types of known systems physically transfer the caller into another call processing system such as a voice response unit, which plays the computer generated announcement, thus requiring additional equipment to process the call. Moveover, these systems do not provide a capability of call handling by a multiplicity of agents. Only a singular type of computer generated response is given during the disconnection and thus the concluding comments cannot be personally tailored to the particular type of customer call.

Likewise, to help relieve the burden on agents of repeating the same standard phrase hundreds of times during a work shift, known call distribution systems play a prerecorded voice message which is played as a preannouncement greeting to calling customers. Such announcement messages played prior to a conversation between a customer and agent. Disadvantageously, these known preannouncement systems require a telephonic call between the customer and agent to be connected while the greeting message is being played. Such preannouncement systems do not significantly increase the overall call servicing efficiency since the agent must be connected to the call while the prerecorded greeting is being played. Therefore, the agent is restricted from servicing other calls during the playing period of the preconversation greeting.

SUMMARY OF THE INVENTION

It is therefore a principle objective of the present invention to provide an automatic call distributor system with an automated postconversation message system in which the disadvantages of known call distributors noted above are overcome by providing means for automatically playing to the callers at customer telephonic units at the conclusion of a call postconversation messages in the voice of the particular selected agent stationed at an agent telephonic set regardless of which agent set the particular agent is located.

This object is achieved in part by providing an automatic call distributor having a multiport switch controlled by a central processing unit for connecting calls made from customers at customer telephonic units through an external telephonic switching network with agents stationed at a plurality of agent telephonic sets coupled with the call distributor, with an automated postconversation message system having means for storing a postconversation voice message in a voice of a particular agent stationed at an agent telephonic set and means responsive to a disconnection from the agent telephonic set of a two way voice path established between the multiport switch and the agent telephonic set for playing the stored postconversation voice message in the voice of the particular agent to a customer telephonic unit.

The object is also achieved by providing an automatic call distributor having a multiport switch controlled by a central processing unit for connecting calls made from customers at customer telephonic units through an external telephonic switching network with agents stationed at a plurality of agent telephonic sets coupled with the call distributor including an automated postconversation message system comprising means for storing a postconversation voice message in a voice of a particular agent stationed at an agent telephonic set, means for selectively connecting a telephonic call from a customer telephonic unit to the particular agent at the agent telephonic set, means for playing the stored postconversation voice message in the voice of the particular agent at the agent telephonic set to a customer at the customer telephonic unit, and means for connecting another telephonic call to the agent telephonic set while the postconversation voice message is played to the customer telephonic unit.

The object is further achieved in part by providing an automatic call distributor with an automated postconversation message system comprising means for determining the type of a customer telephonic call from a customer telephonic unit connected through the multiport switch to an agent telephonic set, means for storing a plurality of different postconversation voice messages respectively associated with different types of customer calls, and means responsive to the determining means for selectively playing to the customer telephonic unit one of the plurality of different postconversation voice messages respectively associated with the type of customer call.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIGS. 3A, 3B and 3C are flow charts of the preferred method of recording and playback of the postconversation voice messages through interaction between an agent at an agent telephonic set and the central processing unit of FIG. 1.

DESCRIPTION OF THE PREFERRED EMBODIMENT

Figure 1:
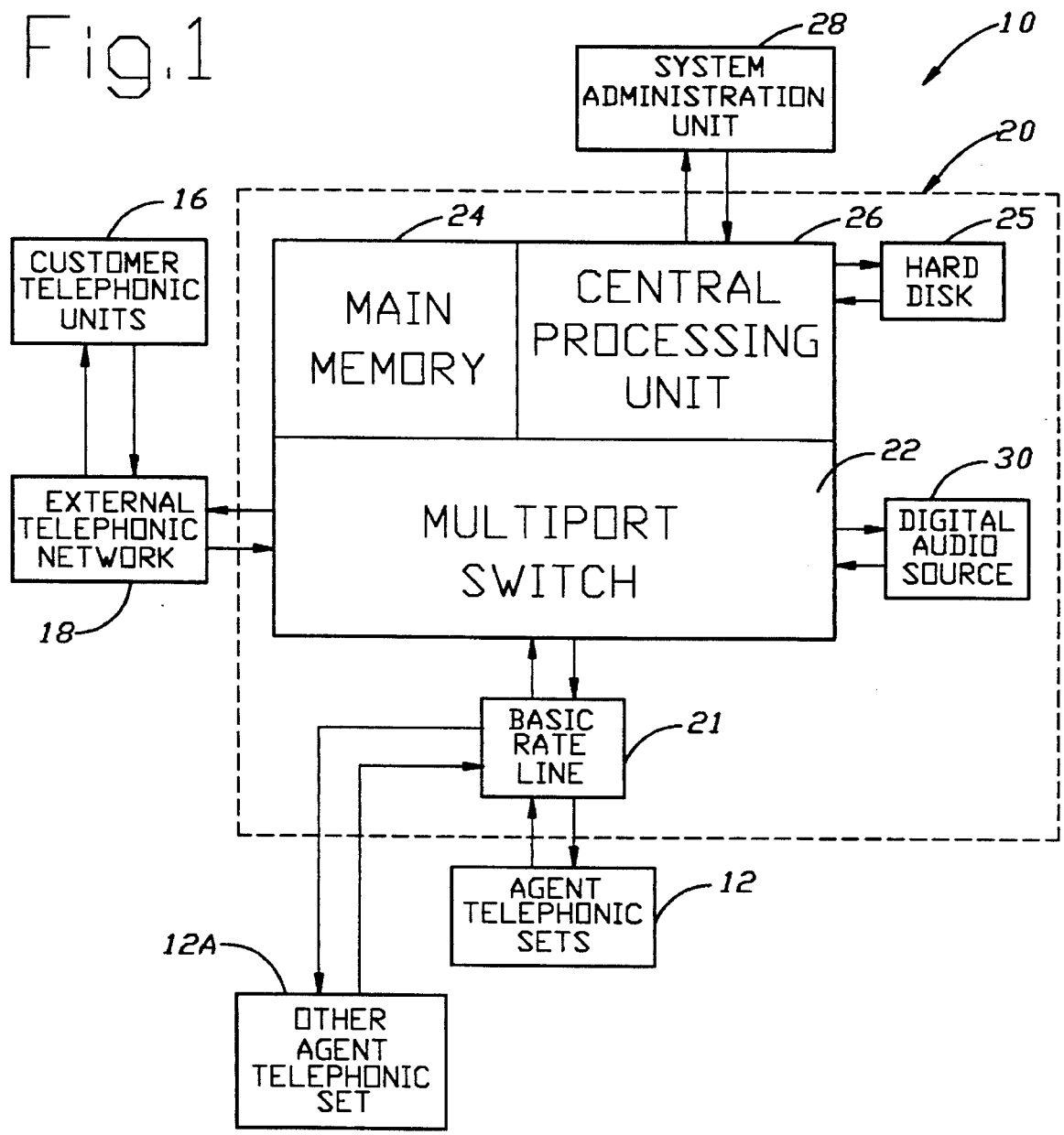
FIG. 1 is a functional block diagram of the preferred embodiment of the automatic call distributor of the present invention as interconnected with known external telephonic switching network of customer telephonic units.

Referring to FIG. 1, the automatic call distributor 20 is connected with a plurality of agent telephonic sets 12 which communicate with customers, i.e. any caller of external telephonic switching network 18, at customer, or external, telephonic units 16 of the external telephonic network 18. The agent sets 12 have a telephone 36, FIG. 2, for audio communication with the customers of the customer units 16, FIG. 1. Additionally, the agent telephonic sets 12 have a visual display 32, FIG. 2, for receipt of information concerning the customers such as the location of the calling customer or the type of products the customer desires to purchase.

The automated postconversation message system 10, FIG. 1, stores ending or postconversation voice messages in the voice of the particular agent, i.e. any operator or user of an agent set 12. An agent receives a call from a customer unit 16 and is connected to the call at an agent telephonic set 12 via a multiport switch 22 of the automatic call distributor 20. The agent telephonic sets are coupled to the switch 22 through a basic rate line (BRL) interface card circuit 21. The basic rate line card 21 provides for the termination of Integrated Services Digital Network (ISDN) basic rate links from the switch 22. The links are used in the automated call distributor 20 of the preferred embodiment to connect the ISDN compatible agent sets 12 into the system 10. A Motorola 68000 microprocessor provides for the overall control of the basic rate line card 21. Generally, while the automated postconversation message system of the present invention can be implemented in numerous types and sizes of call distributors, it is preferably employed in a call distribution system of the type shown in U.S. Pat. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No 4,627,047 of Pitroda et al. entitled "Integrated Voice and Data Telecommunications Switching System", issued Dec. 2, 1986.

Each agent records a plurality of different postconversation voice messages at the agent telephonic set 12. The different postconversation voice messages relate to the different types of customers or customer telephonic calls which are received at the agent sets 12 from the customer telephonic units 16 through the automatic call distributor 20. The central processing unit 26 of the call distributor 20 identifies the types of customer calls received at the multiport switch 22 which is distributed to a particular agent stationed at an agent telephonic set 12. The automatic call distributor associates the identified type of customer call with a corresponding stored postconversation voice message in the voice of the particular agent stationed at the agent set 12 which receives and services the customer call. Once the agent disconnects the two way voice path between the agent telephonic set 12 and the multiport switch 22 the postconversation voice message respectively associated with the type of customer call is automatically played to the customer unit 16 in the voice of the particular agent at the agent set 12.

Two way voice path connections exist between both the multiport switch 22 and the customer telephonic unit 16 and the multiport switch and the agent set 12 once a call connection is established between the customer unit 16 and the agent set 12 through the call distributor 20. In accordance with the present invention, once the agent disconnects the two way voice path between the agent set and the multiport switch 22, the two way voice path between the customer unit 16 and the switch is continued thereby maintaining a call connection between the switch 22 and the customer unit 16 which enables the postconversation voice message to be played to the customer unit even upon the disconnection of the voice path between the agent set 12 and the multiport switch. The agent selectively actuates one of the plurality of soft keys 41, FIG. 2, on the agent set 12 to signal the central processing unit 26, FIG. 1, to disconnect the voice path between the switch 22 and the agent set. The screen 32, FIG. 2, of the agent set visually displays information relating to the choices of different postconversation voice messages which are each responsive to an identified type of customer call. The central processing unit 26, FIG. 1, signals the digital audio source card circuit 30 to automatically play the postconversation voice message associated with the actuated soft key 41, FIG. 2, designated by the displayed post message type information on the display screen 32 in response to the voice path disconnection from the agent set. Preferably, the agent telephonic set is an ISDN based console. For further details of the agent telephonic set and its functionality reference can be made to U.S. patent application Ser. No. 07/976,630 of Dezonno et al. entitled "Automatic Call Distribution System With an ISDN Compatible Call Connection System and Method" filed Nov. 16, 1992.

The received customer call is maintained within the automatic call distributor system 20 subsequent to the disconnection of the call from the agent telephonic set at the end of the conversation between the agent and the customer. Since the two way voice path connection is disconnected or released between the agent set 12 and the switch 22, the agent set is enabled to receive and service another incoming telephonic customer call received through the call distributor 20. The call distributor 20 automatically connects an incoming telephonic call to the agent telephonic set 12 while the postconversation voice message is being played to the previously serviced customer telephonic set 16. Preferably, the agent services the other or new telephonic call during the period in which the postconversation voice message is being played to the original customer at customer telephonic unit 16. This increases the overall call servicing efficiency since an agent is able to begin to service another call while the DAS card 30 of the automated postconversation message system plays one of a plurality of customized conversation ending messages in the voice of the agent to the previously serviced customer.

Figure 2:
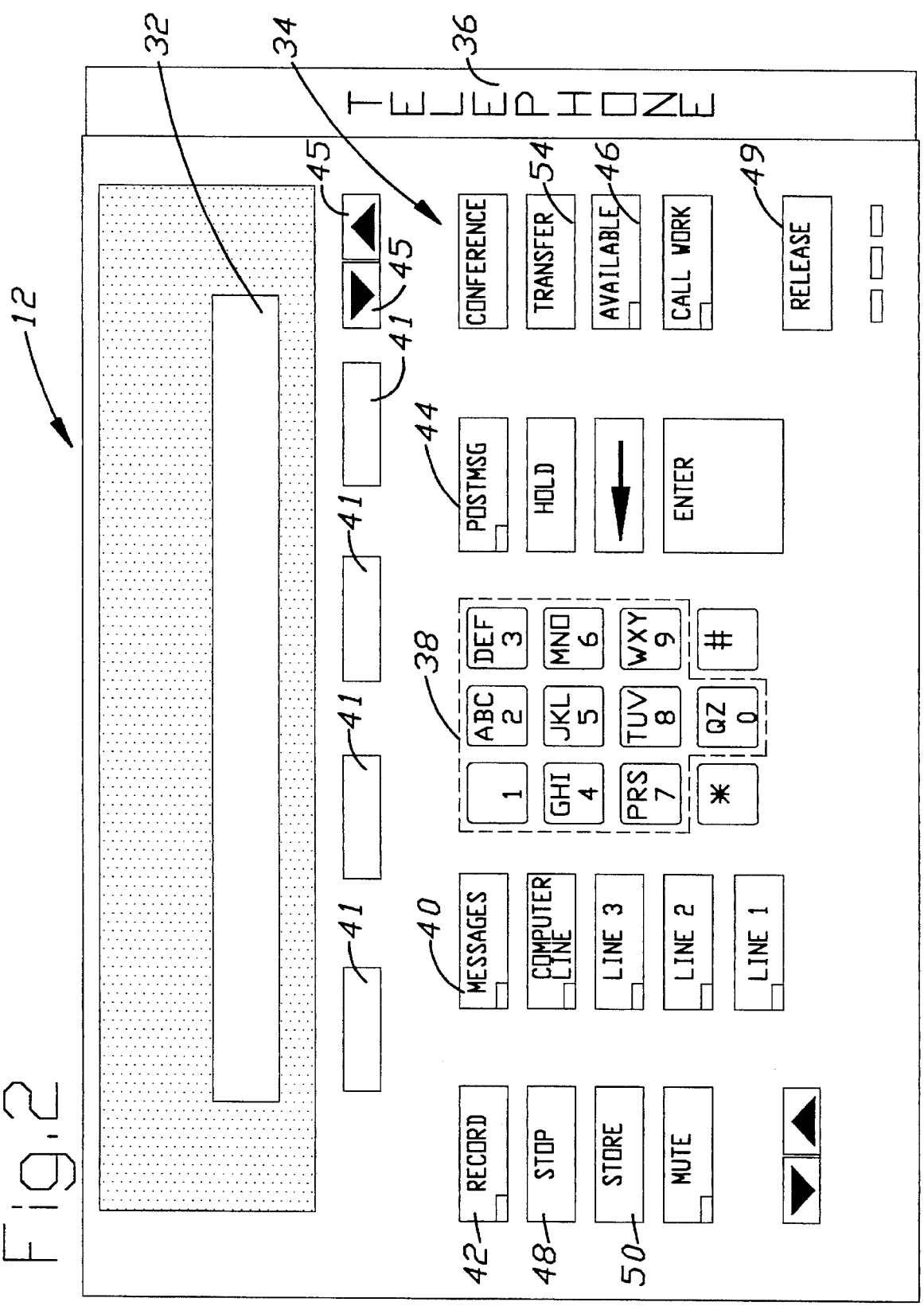
FIG. 2 is a simplified plan view of an agent telephonic set of the automatic call distributor FIG. 1.

To store a postconversation voice message, the agent enters an assigned sign-in code by actuating appropriate numbered keys 38, FIG. 2, on the keypad 34 located on the agent set 12. The agent is assigned and associated sign-in code which is stored in the main memory 24, FIG. 1, of the automated call distributor 20 at initialization of the system. A system administrator enters in a sign-in code number for each agent at a system administration unit 28 connected with the central processing unit 26 of the call distributor 20 (ACD). The system administration unit 28 is preferably a cathode ray tube (CRT) terminal or a personal computer (PC) and has a keyboard (not shown) for entry of information to the system main memory 24. Using a keyboard at the administration unit 28, the number of and the type of postconversation voice messages are assigned to a particular agent and are entered into the central processing unit 26. For example, a particular agent is selectively assigned two ending conversation voice messages, one for sales calls, and another for subscription calls. Alternatively, another agent may also service billing calls and is assigned an additional billing postconversation voice message.

The system administrator programs the central processing unit 26 by assigning each agent sign-in code number a set of postconversation voice messages allowed for recording that correspond to the types of customer calls which the particular agent has connected through the ACD 20. This information is entered into the system administration unit 28 and is stored in memory 24 associated with the central processing unit 26. The central processing unit (CPU) 26 is the primary controller for the automatic call distributor system 20. In the preferred embodiment, the processing power for the CPU 26 is provided by a thirty-two bit Motorola 68030 microprocessor.

In response to the agent signing in on the keypad 34 of the agent set 12, a menu appears on the visual display 32, FIG. 2, of the set. The agent accesses the voice message menu by actuating the messages key 40 on the keypad 34 of the agent set 12. The agent retrieves information through the visual display 32 pertaining to his assigned announcements. Only those messages allowed to be recorded appear on the agent set 12 visual display 32 for a particular agent in response to receipt of the agent sign-in code number. The agent records an ending conversation voice message by actuating a RECORD key 42 on the agent set and speaks the message into a telephone 36 handset or headset at the agent set. An alternative means of initiating the recording and storing of postconversation voice messages is done through actuation of soft keys 41 in which the executed function for the key 41 varies as the menu changes and appears on the liquid crystal display (LCD) display 32. The ending conversation voice message is recorded at the DAS card circuit 30 and digitally stored at the system hard disk 25, FIG. 1, using binary pulse coded modulation.

The agent accesses submenus on the LCD visual display 32 through the key pad 34 to record new ending conversation voice messages or to listen to previously recorded messages. In response to receipt of a particular sign-in code at the central processing unit 26, FIG. 1, the existing recorded postconversation voice messages for the particular agent are down loaded from the system hard disk 25 to the digital audio source card (DAS) 30. The hard disk 25 is a magnetic recording medium which stores all the digitally recorded ending conversation voice messages received from the DAS card 30. The storage capacity of the hard disk in the preferred embodiment ranges form 300 Megabyte to 1.2 Gigabyte of memory. Alternative memory capacities can be utilized for storage without departing from the scope of the invention. Each recorded postconversation voice message is stored as a file at the hard disk 25. The digital audio source card 30 allows the recording of messages for the purpose of ending conversation voice message features, DTMF and MF digit transmission, message transmission, tone transmission and other voice messaging features. The received analog audio voice from the agent is converted into a digital signal by pulse code modulation. A message for recording, spoken by an agent through the telephone 36 at an agent set 12 is converted into a digital signal and transferred to the DAS 30 via the switch 22. The recorded digital voice message is stored to the hard disk 25 for accessible storage. The digital audio source circuit 30 includes a Motorola 68000 microprocessor operating from a 10 Mhz clock to provide the overall controlling functions of the DAS circuit. The DAS card circuit 30 additionally includes an eight Megabyte RAM for storage of the postconversation voice messages down loaded from the hard disk 25 upon receipt of an agent sign-in code at the ACD 20. A description of the general operation of the DAS card circuit 30 can be found with reference to U.S. Pat. No. 5,127,004 of Lenihan et al. entitled "Tone and Announcement Message Code Generator For a Telephonic Switching System and Method", issued Jun. 30, 1992.

Once an ending conversation voice messages is announced at an agent set 12 and digitally recorded on the DAS card 30, the message is up loaded from the DAS card to the system hard disk 25. A postconversation voice message number is stored in the main memory 24 of the CPU 26 which corresponds to the recorded and up loaded postconversation voice message. The ending conversation voice message number represents the particular agent making the recording and the type of customer call to which the ending conversation voice message is responsive (i.e. a sale farewell for a sales call). In response to the agent sign-in code being entered at one of the plurality of agent sets 12, an ending conversation voice message of the particular agent associated with the sign-in code is played to a customer when disconnected by the particular agent 12 of the automatic call distributor 20 by the DAS card 30 connected through the multiport switch 22 in relation to the signing code entered. Therefore, upon a customer call being distributed to a particular agent, the downloaded postconversation voice message at the DAS card 30 corresponding to the call is played to the customer set 16 disconnected by the agent set 12 but connected to the DAS card 30 through the multiport switch 22. For example, when a customer having conversed with a sales department agent at a particular agent set 12 disconnects the customer, the customer will receive a stored postconversation voice message in the voice of the agent at the particular agent set 12 to which the call is disconnected stating "Thank you for calling the sales department, goodbye".

The automated postconversation message system 10 correlates the different voice messages with the different types of callers upon receipt of an incoming call through a Dialed Number Identification Service (DNIS) number. It is common practice for many long distance telephone carriers to assign a DNIS number to various 1-800 or toll-free telephonic carriers to assign a DNIS number to various 1-800 or toll-free telephonic calls coming in through the external network 18, such as American Telephone and Telegraph Co., MCI, and Sprint. Different 1-800 customer calls are assigned a different corresponding DNIS number which indicates or identifies the type of call, or type of customer, which has reached the multiport switch 22. For example, a customer dialing a New York toll-free number for airlines tickets, has an assigned DNIS number corresponding to the called dialed number. The DNIS number and the customer call are carried concurrently to the switch 22. The receipt of the DNIS number at the automatic call distributor 20 for example provides identification of the dialed number being a sales call for airline tickets from a New York customer and thus would identify the type of customer. Various DNIS numbers are assigned to certain voice messages in order to provide responsive postconversation messages. Therefore, receipt of a New York airline ticket sales DNIS number will allow the agent to select a postconversation voice message at the end of the call "Thank you for calling New York ticket sales. I know you will enjoy your flight. Goodbye". Preferably, the postconversation voice message is only played to the customer set 16, so that the agent is available to take subsequent incoming calls which are waiting in queue for the agent service. This reduces the conversation handling time of an agent or operator for the call, which also then reduces the holding time a customer waits for an agent since the agent does not need to actually speak to farewell messages. Furthermore, the agent is relieved from continuously repeating dozens of conversation ending farewell messages throughout a working shift.

An alternative means for associating different stored postconversation voice messages with different types of customer calls is done by a customer inserting identification information through the customer set 16 based on prompts received from the ACD 20. The customer inserts information such as a credit card number, through the numbered key pad on the customer telephonic set 16 in response to a prompt message from a tape player or voice response unit (not shown) upon connection to the automatic call distributor 20. This information received at the call distributor 20 identifies the type of call or customer, such as a gold card customer. Thus, upon receipt of this information, the central processing unit 26 stores this information and loads the audio messages from the hard disk 25 associated with this type of call so that the appropriate message in the voice of the particular agent receiving the call can be played at the termination of the call. Alternatively, a customer call is identified by designating certain trunks or trunk groups on the switch 22 to represent certain types of calls during the installation of the automatic call distributor 20. A call received on a particular trunk indicates the call type or geographical origin. The central processing unit 26 is programmed to initiate the playing of postconversation voice messages in the voice of the agent handling the call in response to the agent terminating the call selectively actuating soft keys 41, FIG. 2, at the agent set 12.

An agent transfers a received telephonic call by actuating a transfer key 54, FIG. 2, and dials the extension number on numeric keys 38 of the other agent to which the call is being transferred. In response to the actuation of the transfer key 54 the central processing unit 26, FIG. 1, routes the transferred call through the multiport switch 22 which is received at another telephonic set 12A. A customer telephonic call is often transferred if an agent is not capable of properly servicing the received call. A postconversation voice message is not played in the voice of the transferring agent if the customer call is in the process of being transferred. The transferring agent originally receiving the call actuates the transfer key 54, FIG. 2, to signal the central processing unit 26, FIG. 1, to transfer the call received from the customer unit 16 to another agent set 12A in lieu of playing a postconversation message in the voice of the transferring agent to the customer unit. The transferring agent actuates the release key 49, FIG. 2, on the agent set 12 for disconnection of the transferred call. The central processing unit 26, FIG. 1, does receive and retains the call identification information associated with the customer call in response to the transferring of the call to another agent set 12A. The central processing unit 26 associates the identification of the type of call being transferred with the respective stored postconversation voice message in the voice of the other agent at the other agent telephonic set 12A. For example if the central processing unit 26, FIG. 1, identifies a received call as a sales call and the sales call is transferred to another agent at another agent set, a postconversation farewell message responsive to a sales call, such as "Thank you for calling the Sales department" is automatically played to the customer in the voice of the other agent receiving the transferred call at the termination of the call at the other agent set 12A. In response to the disconnection of the two way voice path between the other agent set, 12A and the switch 22, a postconversation voice message is played by the DAS card 30, FIG. 1, to the customer unit 16 in the voice of the other agent stationed at the other agent set who serviced the transferred call.

There are different postconversation voice messages stored at the hard disk 25 which are respectively associated with the different types of customers or customer calls. A plurality of postconversation voice messages are recorded to be responsive to the different types of calls received, such as sales calls, billing calls, payroll calls, etc. The multiple postconversation voice messages are stored in a plurality of different agent voices stationed at different agent telephonic sets 12. Different agents record and store the plurality of different postconversation voice messages in their own voice. Preferably, the plurality of different postconversation voice messages are responsive to the different types of identified customer calls. For example, a postconversation message played at the conclusion of a sales call will announce "Thank you for calling the sales department, have a nice day." The postconversation voice message played to the customer at a customer set 16 is in the same voice of the particular agent located at an agent set 12 to which the call is distributed and connected. The hard disk 25 stores many identically worded messages recorded from different agents in the different agent voices. For example, two different agents stationed different agent sets 12 each record and identical farewell messages for a sales call, each saying "Thank you for calling sales". The identically worded message is stored in the particular voice of each agent making the recording.

The automatic call distributor 20 directs a call received from a customer unit 16 to a particular agent at an agent set 12 assigned to service certain customer calls. The assigning of certain calls to particular agents is done by a system administrator through the system administration unit 28. One of the plurality of postconversation farewell voice messages is selected from those stored at the hard disk 25 in the voice of the particular agent with the entered sign-in code upon the completion of the customer call to the particular agent. The customer unit 16 connected through the automatic call distributor 20 and the external network 18 is played the one selected postconversation voice message in the voice of the particular agent associated with the sign-in code entered at the agent set 12. The postconversation voice message played corresponds to the type of customer call; a sales postconversation voice message is played at a customer set in response to the disconnection of a sales call at the agent set 12 to the multiport switch 22 of the automatic call distributor 20.

Alternatively, the agent selectively actuates a soft key 41, FIG. 2, having a designated general postconversation voice message. A menu of information is shown at the display screen 32 above one of the plurality of soft keys 41 at the agent set 12. The information above one of the soft key 41 labels the soft key as the one which plays the other or general postconversation voice message. The general postconversation voice message is a standard farewell message which does not specifically relate to the identification of the type of customer call. For example a general message used is a standard "Goodbye, have a nice day" farewell message which is selectively played if the plurality of postconversation message for identified call type are not responsive to the particular type of call serviced at the agent set 12. The other or general postconversation voice message is played to the customer telephonic unit 16, FIG. 1, regardless of the identified type of customer call in lieu of playing one of the plurality of postconversation messages respectively associated with an identified type of call.

The hard disk 25 internally stores in the ACD 20 the different postconversation voice messages which are respectively associated with the different types of customers. The hard disk memory 25 is accessible to all the agent sets 12. Thus, an agent accesses his assigned stored messages by signing-in at any of the plurality of agent sets 12. In response to the central processing unit 26 determining or identifying the type of customer calling from a customer telephone set 16 and the call being terminated by the agent at an agent set 12, the DAS card 30 plays to the customer one of the different postconversation voice messages associated with the particular type of customer who made the call. A voice message associated with the customer type of call and in the voice of the agent receiving the call is played to the customer unit 16 through a speaker (not shown). The automated postconversation announcement system 10 correlates and plays a different postconversation voice message to a customer set 16 in response to receipt of a different type of customer call. The agent postconversation voice message is recorded on the DAS 30, and stored on the hard disk 25 by a message loader program as described in U.S. patent application Ser. No. 07/977,779 of Baker et al. entitled "Call Distributor With Automatic Preannouncement System and Method" filed Nov. 17, 1992.

Figure 3A:
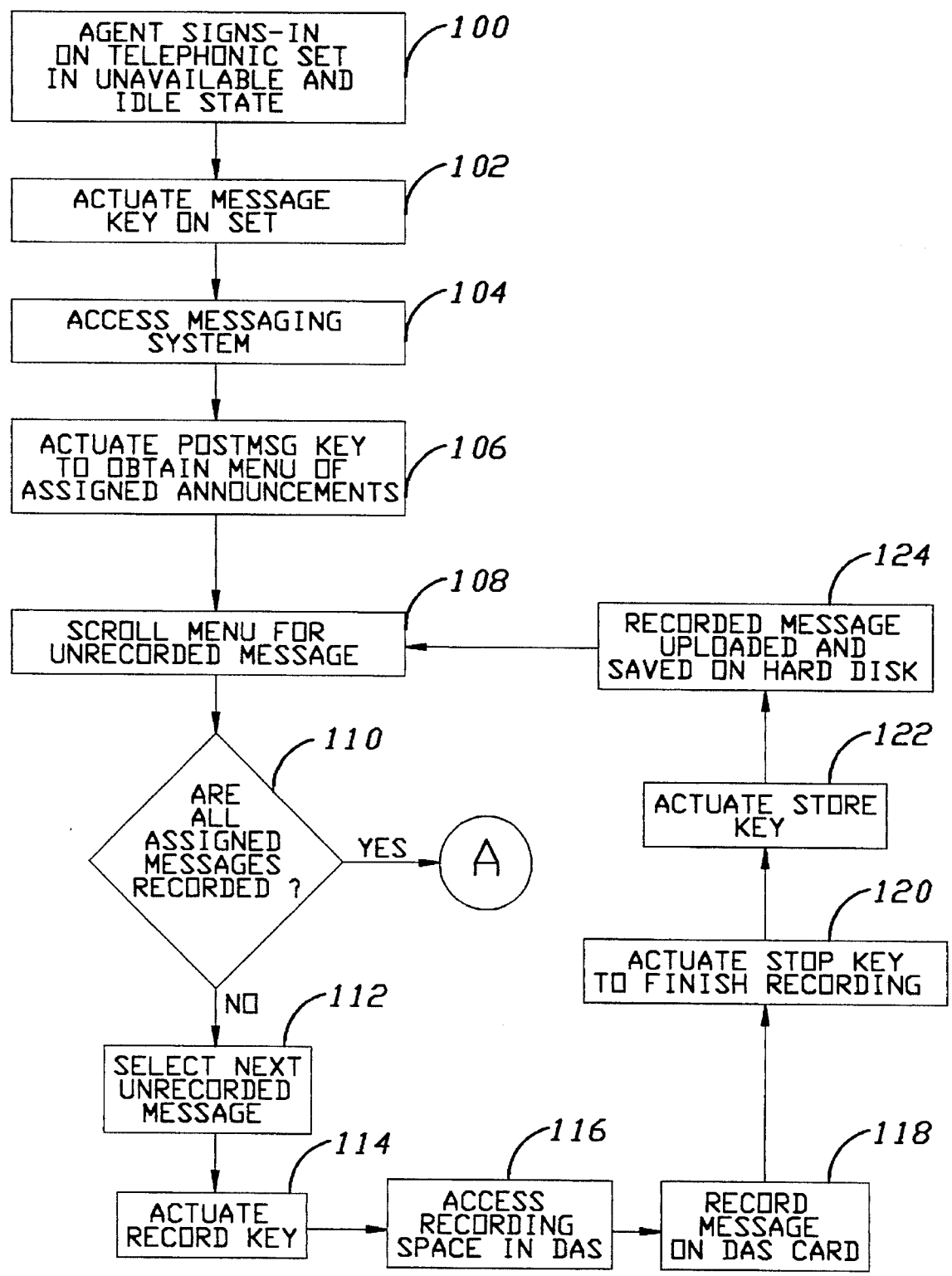

Referring to FIG. 3A, the method of recording and storing a plurality of postconversation voice messages is done in the automatic call distributor 20, FIG. 1, by an agent entering a sign-in code at an agent telephonic set 12 while in an idle and unavailable state to service customer calls, as seen in step 100, FIG. 3A. In step 102, the messages key 40, FIG. 2, on the agent set 12 is actuated and the central processing unit 26, FIG. 1, accesses a message system program in step 104, FIG. 3A, to perform recording. In step 106, the agent actuates one of the programmable function keys, the Post-Msg key 44, FIG. 2, to obtain a menu of the postconversation voice messages assigned to the particular agent shown on the visual display 32.

A sign-in code is associated with each particular agent and stored in the main memory 24, FIG. 1, of the automatic call distributor 20 through the system administration unit 28. The system administrator assigns the messages for recording which corresponds to different types of received calls from the customer telephonic sets 16. The agent records a postconversation voice message as directed by the menu appearing at the visual display which is responsive to the particular type of customer call identified by a trigger received at the automatic call distributor 20. In step 108, FIG. 4A, the agent scrolls the visually displayed menu using a scroll key 45, FIG. 2, on the agent set 12 to obtain an unrecorded message.

In step 110, FIG. 3A, the agent determines if all the assigned messages are recorded. If all the assigned postconversation messages are recorded by the agent, then the agent is prepared to service incoming customer calls. The agent goes from the unavailable or idle state by actuating an Available key 46, FIG. 2, on the agent set 12 to become available to receive or service customer calls, as seen in step 134 of FIG. 3B. If all the messages assigned to the agent are not recorded, then in step 112, FIG. 3A, the agent selects the next unrecorded message from the menu on the display screen 32, FIG. 2 by utilizing the scroll keys 45.

In step 114, FIG. 3A, the Record key 42, FIG. 2, is actuated to indicate the recording of the postconversation voice message. In response to the actuation of the Record key 42, recording space is made available in the memory of the Digital Audio Source Card 30, FIG. 1, as seen in step 116, FIG. 3A. In step 118, the agent announces the appropriate voice message into a telephone 36, FIG. 2, handset or headset at the agent telephonic set 12, and the message is digitally recorded on the DAS card 30. The stop key 48, FIG. 2 is actuated upon completion of the recording of the voice message in step 120. In step 122, FIG. 3A, the store key is actuated to store the digitally recorded postconversation voice message in the voice of the agent at the set 12. In step 124, FIG. 3A, the recorded message is up loaded from the DAS, FIG. 1, and saved at the hard disk 25. The postconversation voice message is digitally stored as a file on the hard disk 25 in the format of pulse code modulation coding.

After completing the recording of a postconversation voice message the agent returns to step 108, FIG. 3A, to scroll the menu to record and store different postconversation voice messages respectively associated and responsive to different types of customer application calls. The hard disk 25, FIG. 1, internally stores multiple postconversation voice messages in different voices which correspond to the different agents recording the voice messages. The hard disk 25 memory is accessible to the plurality of agent sets 12, FIG. 1, for storing the different postconversation voice messages. Often, these stored postconversation messages are identically worded message announcements recorded in the voices of the different agents.

Figure 3B:
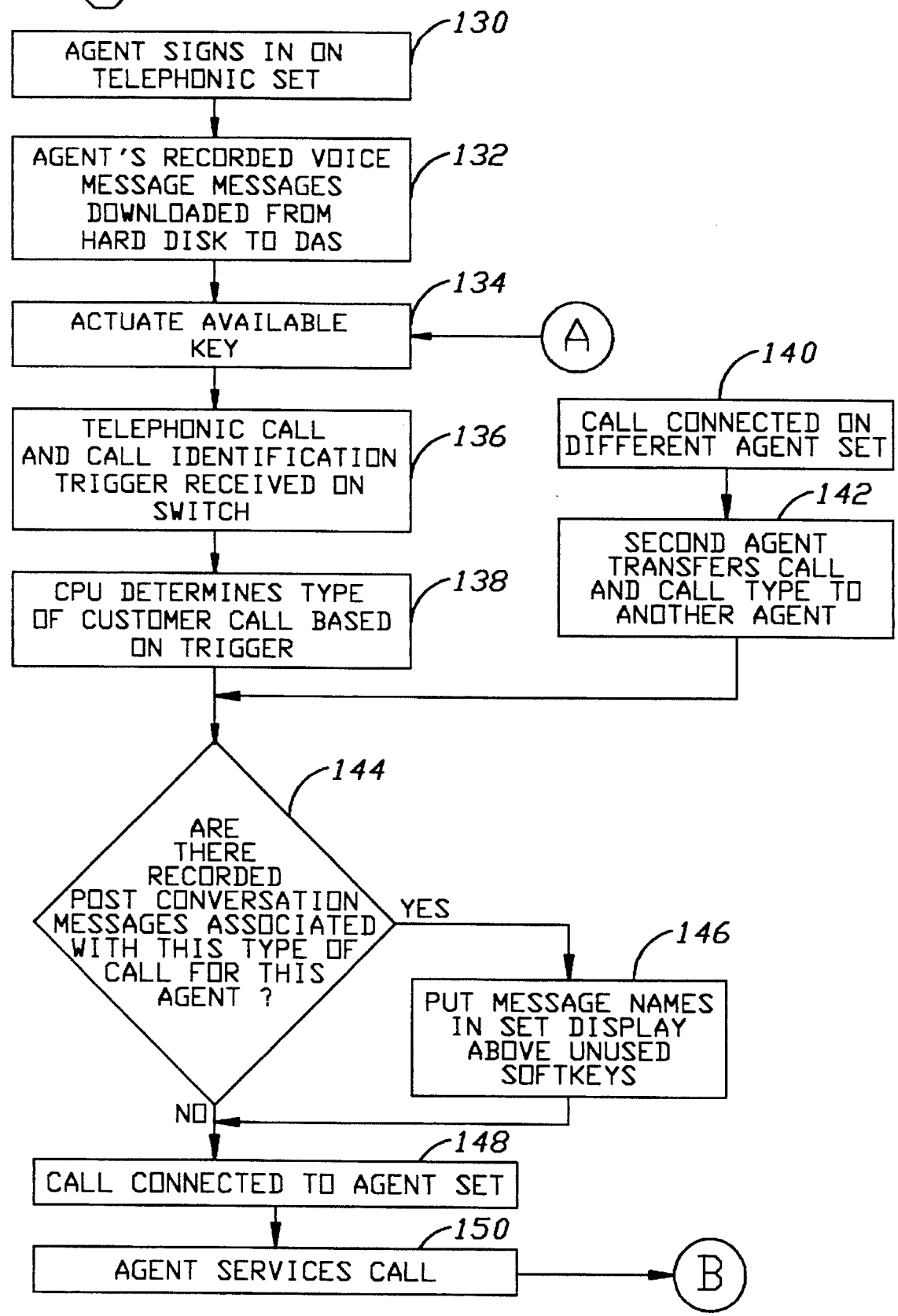

Referring to FIG. 3B, a method of automatically playing postconversation messages is accomplished by the agent signing in with the numeric keys 38, FIG. 2, of the agent telephonic set 12, as seen in step 130. In response to the agent signing in on the telephonic set 12, FIG. 1, the recorded postconversation voice messages of the agent are down loaded from the hard disk 25 to the digital audio source card 30 as seen in step 132, FIG. 3B. In step 134, the Available key 46, FIG. 2, is actuated by the agent to indicate to the central processing unit 26, FIG. 1, that the agent is available to service incoming customer calls from customer telephonic units 16. In step 136, FIG. 3B, a customer telephonic call and an appropriate call identification trigger (DNIS number, customer prompt, designated trunk line, etc.) is received on the multiport switch 22, and the central processing unit 26 determines the type of customer call based on the received call identification trigger in step 138, FIG. 3B.

In step 140, FIG. 3B, a customer call is routed by the ACD 20, FIG. 1, and connected to a different agent telephonic set 12 at another station within the system. In step 142, FIG. 3B, the different agent actuates a transfer key 54, FIG. 2, and the call is transferred to another agent at another agent set.

In step 142, FIG. 3B, the central processing unit 26, FIG. 1, which has already determined the type of customer call based on the received call identification trigger of step 138, retains and associates the call type identification to the agent which receives the transferred call.

In step 144, FIG. 3B, the central processing unit 26, FIG. 1, determines if there is a recorded postconversation voice message associated with the type of received customer call for the particular signed-in agent. If a different type of customer call is received on the switch 22, the central processing unit 26 associates or correlates a different postconversation voice message with the different call. If there is no recorded postconversation voice message associated with the type of customer calling, then the call is connected directly to the agent set 12, FIG. 1 in step 148, FIG. 4B, and the agent services the customer call in step 150.

If there is at least one recorded voice postconversation message associated with the received customer call as determined by the ACD 20, FIG. 1, in step 144, FIG. 3B, information is placed in step 146 in the agent set display 32, FIG. 2, above the programmable function keys or soft keys 41 of the agent set 12 concerning which messages can be played to the customer. The customer information or display screen message is stored in the automatic call distributor 20 main memory 24, FIG. 1, and is respectively associated with the plurality of different customer calls or customer types.

In response to receipt of a call identification trigger (from a received DNIS number customer prompt designated trunk line, etc.) the central processing unit 26 automatically provides one of a plurality of display screen messages to the display screen 32, FIG. 2, which is associated with the type of customer call connected to the agent set 12 via the automatic call distributor 20. In step 150, FIG. 3B, the agent proceeds to process the call until being ready for disconnection.

In referring to FIG. 3C, the central processing unit 26 determines in step 152 whether the agent at the agent set 12 actuates either the Release key 49, FIG. 2, or one of the programmable function keys 41 associated with the postconversation voice messages. The program flow continues to monitor for this condition if the condition is not present in step 152, FIG. 3C. In step 154, if the agent at the agent set 12 actuates the Release key 49, FIG. 2, the automatic call distributor 20 disconnects the call in step 156, FIG. 3C, between the customer telephonic set 16 and the agent set 12 of FIG. 1. The central processing unit 26, FIG. 1, sets the agent as available to receive and service another incoming call in step 158, FIG. 3C, and returns the agent to step 136 of FIG. 3B.

When a programmable soft key 41 is the key actuated by an agent as determined by a negative test of step 160, the process of playing a postconversation voice message begins. The screen 32, FIG. 2, of the agent set 12 visually displays the choices of different postconversation voice messages which are each responsive to an identified type of customer call. In response to the actuation of one of the plurality of soft keys 41, the selected one of the programmable plurality of different postconversation messages identified on the display screen 32, directly above the selected soft key is played to the customer unit 16, FIG. 1. Preferably, the selected postconversation voice message is the one which best responds as a farewell ending to the previous conversation between the agent and the calling customer. The central processing unit 26, FIG. 1, first puts the channel number which the agent set 12 was communicating on into a temporary holding area of memory 24 of the central processing unit. The central processing unit, in step 162, FIG. 3C, then disconnects the agent set from the time slot or channel number in the central processing unit memory 24. The two-way communication voice data between the agent telephonic set 12 and the multiport switch is disconnected which enables the agent set to receive another incoming telephonic call. At this point, the customer telephonic unit 16, FIG. 1, still maintains a call connection through the external telephonic network 18 to a channel in the multiport switch 22. The central processing unit then set the agent as available to receive another incoming call in step 164, FIG. 3C, and returns the agent to step 136 of FIG. 3.

In step 166, FIG. 3C, the central processing unit 26, FIG. 1, instructs the digital audio source card 30 to play the postconversation voice message to the customer telephonic unit 16. The postconversation voice message is in the same voice as the agent which last spoke with the caller at the customer telephonic unit. The farewell message played is in response to the type of call received by the agent at the agent telephonic set 16. In step 168, FIG. 3C, the postconversation message will play until either the caller at the customer unit disconnects the conversation by hanging up or the playing completes the postconversation voice message. Once either of these conditions are met in step 170, the multiport switch 22, FIG. 1, disconnects the channel connection to the external telephonic network 18. In order to use the caller channel again in the multiport switch 22, the central processing unit 26, in step 172, then removes the channel from the disconnect queue in step 172, FIG. 3C, so that further calls can be handled on communication channels which played the postconversation voice message to the caller telephonic set 16. In step 174, the program flow of the central processing unit 26, returns to step 136. For further details of the voice message recording and playback interaction between an agent telephonic set and the central processing unit, reference can be made to U.S. patent application Ser. No. 07/977,779 of Baker et al. entitled "Call Distributor With Automatic Preannouncement System and Method" filed Nov. 17, 1992.

While a detailed description of the preferred embodiment of the invention has been given, it should be appreciated that many variations can be made thereto without departing from the scope of the invention as set forth in the appended claims.

I claim:

1. In an automatic call distributor having a multiport switch controlled by a central processing unit for connecting calls made from customers at customer telephonic units through an external telephonic switching network with agents stationed at a plurality of agent telephonic sets coupled with the call distributor, the improvement being an automated postconversation message system, comprising:

means for storing a postconversation voice message in a voice of a particular agent stationed at an agent telephonic set;

means for establishing a two way voice path between the multiport switch and the agent telephonic set;

means for temporarily putting a channel number of a channel on which the agent telephonic set was communicating with a customer telephonic unit in memory;

means for disconnecting the agent telephonic set from the channel with the channel number put in memory while maintaining a call connection with the customer telephonic unit on the channel with the channel number put in memory; and means responsive to a disconnection from the agent telephonic set of the two way voice path established between the multiport switch and the agent telephonic set for internally playing from within the automatic call distributor the stored postconversation voice message in the voice of the particular agent to the customer telephonic unit over the channel disconnected from the agent telephonic set.

2. The automatic call distributor of claim 1 including means for maintaining the call connection between the multiport switch and the customer telephonic unit on the channel when the stored postconversation voice message is played to the customer telephonic unit in response to the disconnection of the agent telephonic set voice path with the multiport switch.

3. The automatic call distributor of claim 2 in which the storing means includes means for storing a plurality of different postconversation voice messages in the voice of the particular agent stationed at the agent telephonic set, and including means at the agent telephonic set for individually selectively actuating the playing of individually selected ones of the plurality of different postconversation voice messages.

4. The automatic call distributor of claim 2 including means for automatically connecting an incoming telephonic call on another channel to the agent telephonic set while the postconversation voice message is being played to the customer telephonic unit.

5. The automatic call distributor of claim 2 including means for recording multiple postconversation voice messages in a plurality of different agent voices.

6. The automatic call distributor of claim 5 including means for identifying a type of telephonic call received from the customer telephonic unit and connected at the agent telephonic set, means at the agent telephonic set for transferring the identified type of telephonic call from the agent telephonic set to another agent telephonic set in lieu of playing the postconversation voice message in the voice of the particular agent at the agent set to the customer telephonic set, means for retaining the identification of the type of telephonic call transferred to the other agent telephonic set, and means for playing another postconversation voice message respectively associated with the identified type of telephonic call in the voice of another agent stationed at the other agent telephonic set in response to another disconnection from the other agent telephonic set of the transferred call between the other agent telephonic set and the multiport switch.

7. The automatic call distributor of claim 2 including means for digitally recording a plurality of different postconversation voice messages respectively associated with different types of customer calls.

8. The automatic call distributor of claim 7 including means for identifying one of the plurality of different types of customer calls received from different customer telephonic units at the automatic call distributor, means for respectively associating one of the plurality of the postconversation voice messages with the one identified type of customer calls, and means for playing the one postconversation voice message to the customer telephonic unit respectively associated with the one identified type of customer call.

9. The automatic call distributor of claim 7 including means for playing another postconversation voice message to the customer telephonic unit regardless of the identified type of customer call in lieu of playing the one postconversation voice message respectively associated with the one identified type of customer call.

10. In an automatic call distributor having a multiport switch controlled by a central control processing unit for connecting calls made from customers at customer telephonic units through an external telephonic switching network with agents stationed at a plurality of agent telephonic sets coupled with the call distributor, the improvement being an automated postconversation message system, comprising:

means for storing a postconversation voice message in a voice of a particular agent stationed at an agent telephonic set;

means for selectively connecting over a channel a telephonic call from a customer telephonic unit to the particular agent at the agent telephonic set;

means for temporarily putting in memory a channel number of the channel on which the agent telephonic set communicates the telephonic call with the customer telephonic unit;

means for disconnecting the agent telephonic set from the channel with the channel number put in memory;

means for playing the stored postconversation voice message in the voice of the particular agent at the agent telephonic set to a customer at the customer telephonic unit over the channel which carried said selectively connected telephonic call; and means for connecting another telephonic call over a different channel to the agent telephonic set while the postconversation voice message is played to the customer telephonic unit over said channel with the channel number put in memory.

11. The automatic call distributor of claim 10 in which the playing means includes means for playing the stored postconversation voice message in response to a disconnection from the agent telephonic set of a two way voice path established between the multiport switch and the agent telephonic set.

12. The automatic call distributor of claim 11 including means for maintaining a call connection between the multiport switch and the customer telephonic unit on said channel when the stored postconversation voice message is played to the customer telephonic unit over the channel in response to the disconnection from the agent telephonic set of the voice path to the multiport switch.

13. The automatic call distributor of claim 12 in which the storing means includes means for storing a plurality of different postconversation voice messages in the voice of the particular agent stationed at the agent telephonic set, and including means at the agent telephonic set for selectively actuating the playing of individually selected ones of the plurality of different postconversation voice messages.

14. The automatic call distributor of claim 12 including means for recording multiple postconversation voice messages in a plurality of different agent voices.

15. The automatic call distributor of claim 14 including means for identifying a type of telephonic call received from the customer telephonic unit and connected at the agent telephonic set, means at the agent telephonic set for transferring the identified type of telephonic call from the agent telephonic set to another agent telephonic set in lieu of playing the postconversation voice message in the voice of the particular agent at the agent telephonic set to the customer telephonic unit, means for retaining the identification of the type of call transferred to the other agent telephonic set, means for respectively associating the identification of the type of call transferred to the other agent telephonic set with one of the postconversation voice messages in the voice of the other agent, and means for playing the one of the postconversations voice messages respectively associated with the identified type of telephonic call in the voice of the other agent stationed at the other agent telephonic set in response to another disconnection from the other agent telephonic set of the transferred call between the other agent telephonic set and the multiport switch.

16. The automatic call distributor of claim 12 including means for digitally recording a plurality of different postconversation voice messages respectively associated with different types of customer calls.

17. The automatic call distributor of claim 16 including means for identifying one of the plurality of different types of customer calls received from different customer telephonic units at the automatic call distributor, means for respectively associating one of the plurality of postconversation voice messages with one of the identified types of customer calls, and means for playing the one postconversation voice message to the customer telephonic unit respectively associated with the one identified type of customer call.

18. The automatic call distributor of claim 17 including means for playing another postconversation voice message to the customer telephonic unit regardless of the identified type of customer call in lieu of playing the one postconversation voice message respectively associated with the one identified type of customer call.

19. In an automatic call distributor having a multiport switch controlled by a central processing unit for connecting calls made from customers at customer telephonic units through an external telephonic switching network with agents stationed at a plurality of agent telephonic sets coupled with the call distributor, the improvement being an automated postconversation message system comprising:

means for determining a type of a customer call based on call type identification information associated with the customer call from a customer telephonic unit connected through the multiport switch to an agent telephonic set;

means for storing a plurality of different postconversation voice messages respectively associated with different types of customer calls;

means for connecting over a channel the customer call from the customer telephonic unit to the agent telephonic set;

means for temporarily putting in memory a channel number of the channel on which the agent telephonic set communicates the customer call with the customer telephonic unit;

means for disconnecting the agent telephonic set from the channel with the channel number put in memory; and means responsive to the determining means for selectively playing to the customer telephonic unit one of the plurality of different postconversation voice messages respectively associated with the type of customer call over the channel disconnected from the agent telephonic set.

20. The automatic call distributor of claim 19 in which the selectively playing means includes means for playing the postconversation voice messages in a voice of a particular agent at the agent telephonic set connected with the customer call.

* * * * *